(12) United States Patent
Satoh et al.

(10) Patent No.: US 8,052,536 B2
(45) Date of Patent: Nov. 8, 2011

(54) BOOT FOR UNIVERSAL JOINT

(75) Inventors: Hiroyuki Satoh, Makinohara (JP);
Kenta Yamazaki, Iw ata (JP); Minoru Ishijima, Iw ata (JP)

(73) Assignees: NOK Corporation, Tokyo (JP); NTN Corporation, Osaka (JP)

( * ) Notice: Subject to any disclaimer, the term of this patent is extended or adjusted under 35 U.S.C. 154(b) by 480 days.

(21) Appl. No.: 12/083,544

(22) PCT Filed: Oct. 2, 2006

(86) PCT No.: PCT/JP2006/319659
§ 371 (c)(1),
(2), (4) Date: Apr. 14, 2008

(87) PCT Pub. No.: WO2007/043372
PCT Pub. Date: Apr. 19, 2007

(65) Prior Publication Data
US 2009/0253522 A1    Oct. 8, 2009

(30) Foreign Application Priority Data
Oct. 14, 2005 (JP) .................. 2005-299958

(51) Int. Cl.
*F16D 3/84* (2006.01)
(52) U.S. Cl. ..................................... 464/175
(58) Field of Classification Search .................. 464/175; 277/636
See application file for complete search history.

(56) References Cited

U.S. PATENT DOCUMENTS

| | | | |
|---|---|---|---|
| 5,419,741 A * | 5/1995 | Schwarzler | 464/175 |
| 6,488,588 B1 | 12/2002 | Kadota et al. | |
| 7,534,172 B2 * | 5/2009 | Wormsbaecher | 464/175 |
| 2009/0166987 A1 * | 7/2009 | Shibata | 277/636 |

FOREIGN PATENT DOCUMENTS

| | | |
|---|---|---|
| EP | 1 079 128 | 2/2001 |
| JP | S57-190926 | 12/1982 |
| JP | S59-17289 | 4/1984 |
| JP | S62-176524 | 11/1987 |
| JP | H7-16072 | 3/1995 |
| JP | 2000-266072 | 9/2000 |
| JP | 2003-049944 | 2/2003 |
| JP | 2003-139158 | 5/2003 |
| JP | 2005-226779 A * | 8/2005 |
| WO | 00/55518 | 9/2000 |

OTHER PUBLICATIONS

International Search Report dated Dec. 26, 2006.

* cited by examiner

*Primary Examiner* — Gregory Binda
(74) *Attorney, Agent, or Firm* — Jacobson Holman PLLC

(57) ABSTRACT

To prevent inverting of a mountain portion of a bellows member when a rotating shaft is angularly displaced, the boot includes a bellows member with large and small diameter mounting members. A first mountain portion nearest the large diameter mounting member rises from the large diameter mounting member. A length ($L_1$) between a top of the first mountain portion and a bottom at the large diameter mounting member side is not more than a length ($L_2$) between the inner peripheral position of the bottom and an end portion of an outer ring at the rotating shaft side. A first valley portion adjacent to the first mountain portion is positioned at the rotating shaft side from the end part.

1 Claim, 6 Drawing Sheets

PRIOR ART

BOOT FOR UNIVERSAL JOINT

This is a national stage of the International Application No. PCT/JP2006/319659 filed Oct. 2, 2006 and published in Japanese.

BACKGROUND OF THE INVENTION

1. Field of the Invention

The present invention relates to a boot for sealing a universal joint such as a constant velocity universal joint (CVJ) used in a driving shaft or the like of a motor vehicle.

2. Description of Conventional Art

The constant velocity universal joint (CVJ) used in a driving shaft or the like of a motor vehicle is sealed with a boot so as to prevent lubricant grease filled in a joint unit from leaking out thereof and to prevent muddy water and dust from intruding into the joint unit. FIG. 5 is a partially sectional side view showing such a kind of boot for the constant velocity universal joint, and FIG. 6 is a sectional view showing a deformed state of the boot 100 shown in FIG. 5.

The boot 100 shown in FIG. 5 is formed of rubber-like elastic material by blow molding or injection molding, and comprises an flexible bellows member 101 having three mountain portions 101a, 101c and 101e and two valley portions 101b and 101d which extend circumferentially and formed alternately, a large-diameter mounting portion 102 formed at one end of the bellows member 101, and a small-diameter mounting member 103 formed at the other end of the bellows member 101, and the first mountain portion 101a next to the large-diameter mounting potion 102 in the bellows member 101 rises from the large-diameter mounting portion 102 (for example, referring to Japanese unexamined patent publication No. 2003-49944).

The boot 100 is clamped and fixed by a clamping band 104 made of a metal material at the large-diameter mounting member 102 onto an outer periphery of an end of the outer ring 201 formed at the side of one rotation shaft 202 in the constant velocity universal joint 200, and is clamped and fixed by another clamping band 105 made of a metal material at the small-diameter mounting member 103 onto an outer periphery of the other rotation shaft 203 connected in such a manner as to be angularly displaceable with respect to a shaft axis of the outer ring 201 (rotation shaft 202) by a bearing mechanism (not shown) inside the outer ring 201, thereby to prevent foreign materials from entering into the bearing mechanism of the constant velocity universal joint 200, and to prevent lubricant grease filled in the bearing mechanism from leaking out thereof.

Further, since the boot 100 is rotated together with as the outer ring 201 (rotation shaft 202) and rotation shaft 203, when the rotation shaft 203 is in a state of being angularly displaced with respect to the shaft axis of the outer ring 201, the bellows member 101 is deformed in such a repetitious fashion as to be extended in a half rotational cycle, while contracted in another half rotational cycle. Consequently, the above-mentioned bellows member 101 is required to have a sufficient film length for smooth deformation, even when the rotation shaft 203 is angularly displaced largely as shown in FIG. 6. Because if the film length is insufficient, when the rotation shaft 203 is angularly displaced largely, the first mountain portion 101a next to the large-diameter mounting member 102 in the bellows member 101 is reversed to produce a depression A as shown in FIG. 6, resulting in increase in amount of bending deformation. Thus, because of such repetition of reversing, there occurs a problem that the bellows member 101 is deteriorated at the first mountain portion 101a due to fatigue, and its durability is lowered.

Further, it is effective to enlarge the outside diameter of the mountain portion 101a (and mountain portions 101c, 101e) to secure sufficient film length of the bellows member 101 in order to prevent the reversing (depression A). However, in the case where a strict restriction is imposed on the outside diameter from the view point of designing, it has been difficult to secure the sufficient film length.

SUMMARY OF THE INVENTION

The present invention is made by taking the points mentioned above into consideration, and an object of the present invention is to provide a boot for sealing a universal joint capable of effectively preventing reversing of a mountain portion of a bellows member when a rotation shaft is angularly displaced, without enlarging the outside diameter of the bellows member.

In order to achieve the above-mentioned object, the present invention provides a boot for sealing a universal joint. A bellows member includes mountain portions and valley portions which extend circumferentially and are disposed alternately. A large-diameter mounting member is formed at one end of the bellows member and mounted on an outer periphery of an outer ring of the universal joint. A small-diameter mounting member is formed at the other end of the bellows member and mounted on an outer periphery of a rotation shaft coupled so as to be angularly displaceable to a bearing mechanism provided inside the outer ring. A first mountain portion of the bellows member next to the large-diameter mounting member rises from the large-diameter mounting member. A length from the top of the first mountain portion to the bottom thereof at the side of the large-diameter mounting member is not more than a length from a position on the outer periphery of the outer ring corresponding to a position of the inner periphery of the bottom to an end portion of the outer ring at the side of the rotation shaft. A first valley portion next to the first mountain portion is positioned away from the end portion of the outer ring toward the rotation shaft.

With such structure, even when the rotation shaft coupled to the bearing mechanism is angularly displaced largely with respect to the outer ring of the universal joint, the top of first mountain portion is not reversed to cave inward at the side where the bellows member is extended by the angular displacement of the rotation shaft. This is because, when a portion between the top and bottom of the first mountain portion falls due to the extension of the bellows member, reversing of the fallen portion inward is prevented by the end portion of the outer race, since the length of the fallen portion is not more than the distance from the end portion of the outer ring to the bottom of the first mountain portion.

With the structure of the boot for sealing universal joint according to the present invention, when the rotation shaft coupled to the bearing mechanism is angularly displaced largely with respect to the outer ring of the universal joint, the first mountain portion next to the large-diameter mounting member in the bellows member is prevented from being reversed by the outer ring. As a result, it is not necessary to enlarge the film length of the bellows member by increasing the outside diameter of the mountain portion, and the boot can be made compact, accordingly.

DETAILED DESCRIPTION OF PREFERRED EMBODIMENTS

Specific preferred embodiments of a boot for sealing a universal joint according to the present invention will be explained below with reference to the drawings, which are however for the purpose of illustration only and not intended to limit the scope of the appended claims.

Figure 1:
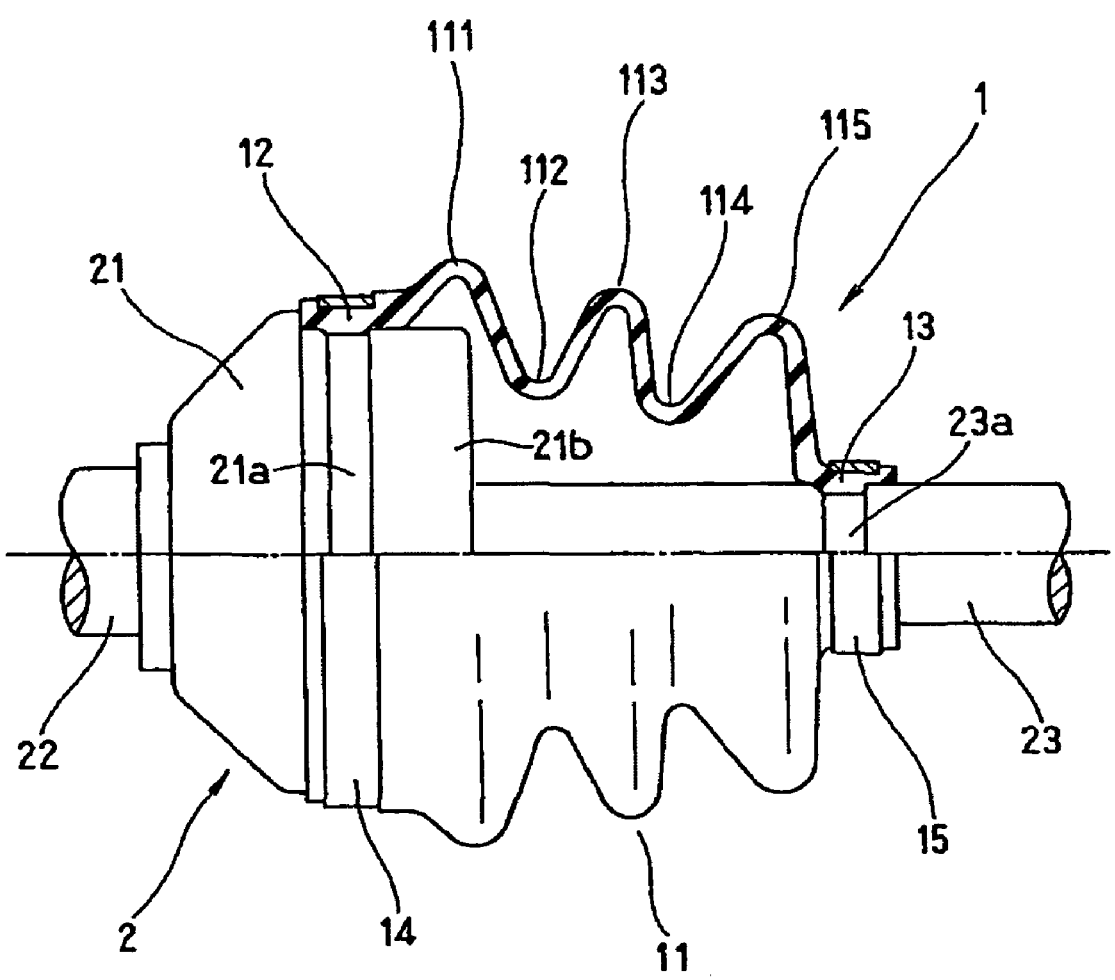
FIG. 1 is a partially cut side view of a boot for sealing a universal joint showing a preferred embodiment of the present invention.
Figure 2:
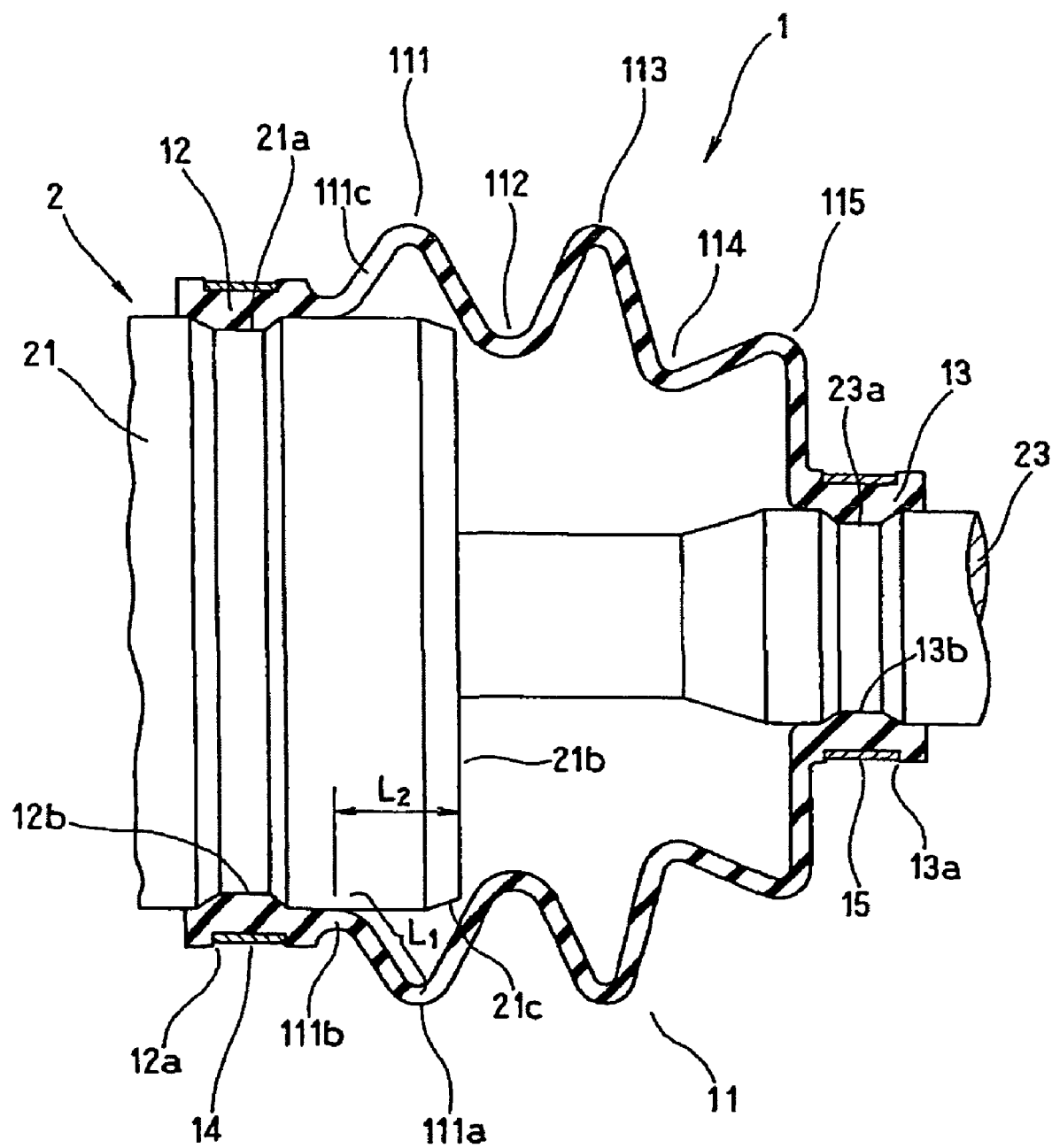
FIG. 2 is a cross sectional view showing a main part of the boot as shown in FIG. 1.

FIG. 1 is a partially cut side view of a boot for sealing a universal joint showing a preferred embodiment of the present invention, and FIG. 2 is a cross sectional view showing a main part of the boot shown in FIG. 1.

A boot 1 as illustrated in the drawings is formed of a rubber-like elastic material or a resilient synthetic resin material by blow molding, injection molding or the like, and the basic structure of the boot 1 is similar to that of the conventional one, i.e. the boot 1 comprises a flexible bellows member 11 having three mountain portions 111, 113 and 115 and two valley portions 112 and 114 which extend circumferentially and disposed alternately, a large-diameter mounting member 12 formed at one end of the bellows member 11, and a small-diameter mounting member 13 formed at the other end of the bellows member 11, and the first mountain portion 111 next to the large-diameter mounting potion 12 of the bellows member 11 rises from the large-diameter mounting member 12.

As shown in FIG. 2, on the outer peripheral surface of the large-diameter mounting member 12, there is formed a groove 12a for attaching a clamping band 14, which is made of a metal material, extending in a circumferential direction, while on the inner peripheral surface of the large-diameter mounting member 12 there is formed a sealing projection 12b extending in the circumferential direction. And in a similar way, on the outer peripheral surface of the small-diameter mounting member 13, there is formed a groove 13a for attaching a clamping band 15, which is made of a metal material, extending in a circumferential direction, while on the inner peripheral surface of the small-diameter mounting member 13 there is formed a sealing projection 13b extending in the circumferential direction.

On the other hand, the reference numeral 2 designates a constant velocity joint as a universal joint comprising an outer ring 21 formed at one end of a rotation shaft 22, a bearing mechanism (not shown) provided inside the outer ring 21, and another rotation shaft 23 coupled by the bearing mechanism so as to be angularly displaceable with respect to a shaft axis of the outer ring 21 (rotation shaft 22).

On a predetermined position of an outer periphery of the outer ring 21, there is formed an engaging groove 21a extending in a circumferential direction. The large-diameter mounting member 12 of the boot 1 is firmly fixed on the outer ring 21 by clamping the clamping band 14 attached to the groove 12a with the sealing projection 12b formed on the inner peripheral surface of the large-diameter mounting member 12 being fitted closely into the groove 21a. And in a similar way, the outer periphery on a predetermined position of the rotation shaft 23, there is formed an engaging groove 23a extending in a circumferential direction. The small-diameter mounting member 13 of the boot 1 is firmly fixed on the rotation shaft 23 by clamping the clamping band 15 attached to the groove 13a with the sealing projection 13b formed on the inner peripheral surface of the small-diameter mounting member 13 being fitted closely into the groove 23a.

In the mounting structure of the boot 1 as shown in FIG. 2, the top 111a of the first mountain portion 111 next to the large-diameter mounting member 12 of the bellows member 11 is located away from the end portion 21b of the outer ring 21 at the side of rotation shaft 23 toward the engaging groove 21a, i.e. located at a position above the outer periphery of the outer ring 21. Furthermore, the length $L_1$ of a portion between the top 111a of the first mountain portion 111 and the bottom 111b thereof located at the side of large-diameter mounting member 12 is not more than the length $L_2$ in an axial direction between a position corresponding to the bottom 111b and the end portion 21b of the outer ring 21 at the side of rotation shaft 23 ($L_1$ $L_2$). The portion 111c of the bellows member 11 extending between the top 111a of the first mountain portion 111 and the bottom 111b of the first mountain portion 111 is configured to have a substantially straight shape in section, as shown in FIG. 2.

Further, in the mounting structure of the boot 1 as shown in FIG. 2, the first valley portion 112 next to the first mounting portion 111 at the opposite side of the large-diameter mounting member 12 is located away from the end portion 21b of the outer ring 21 toward the rotation shaft 23.

Further, it is preferable that the shoulder portion of the end portion 21b of outer periphery of the outer ring 21 at the side of rotation shaft 23 is made to be a rounded or chamfered portion 21c.

With the above-mentioned structure, the large-diameter mounting member 12 of the boot 1 is clamped and fixed on the engaging groove 21a formed on outer periphery of the outer ring 21 of constant velocity joint 2 by the clamping band 14, while the small-diameter mounting member 13 of the boot 1 is clamped and fixed on the engaging groove 23a formed on outer periphery of the rotation shaft 23 by another clamping band 15, thereby to prevent foreign matters from entering into the bearing mechanism, and to prevent lubricant grease filled in the bearing mechanism from leaking out thereof.

Figure 3:
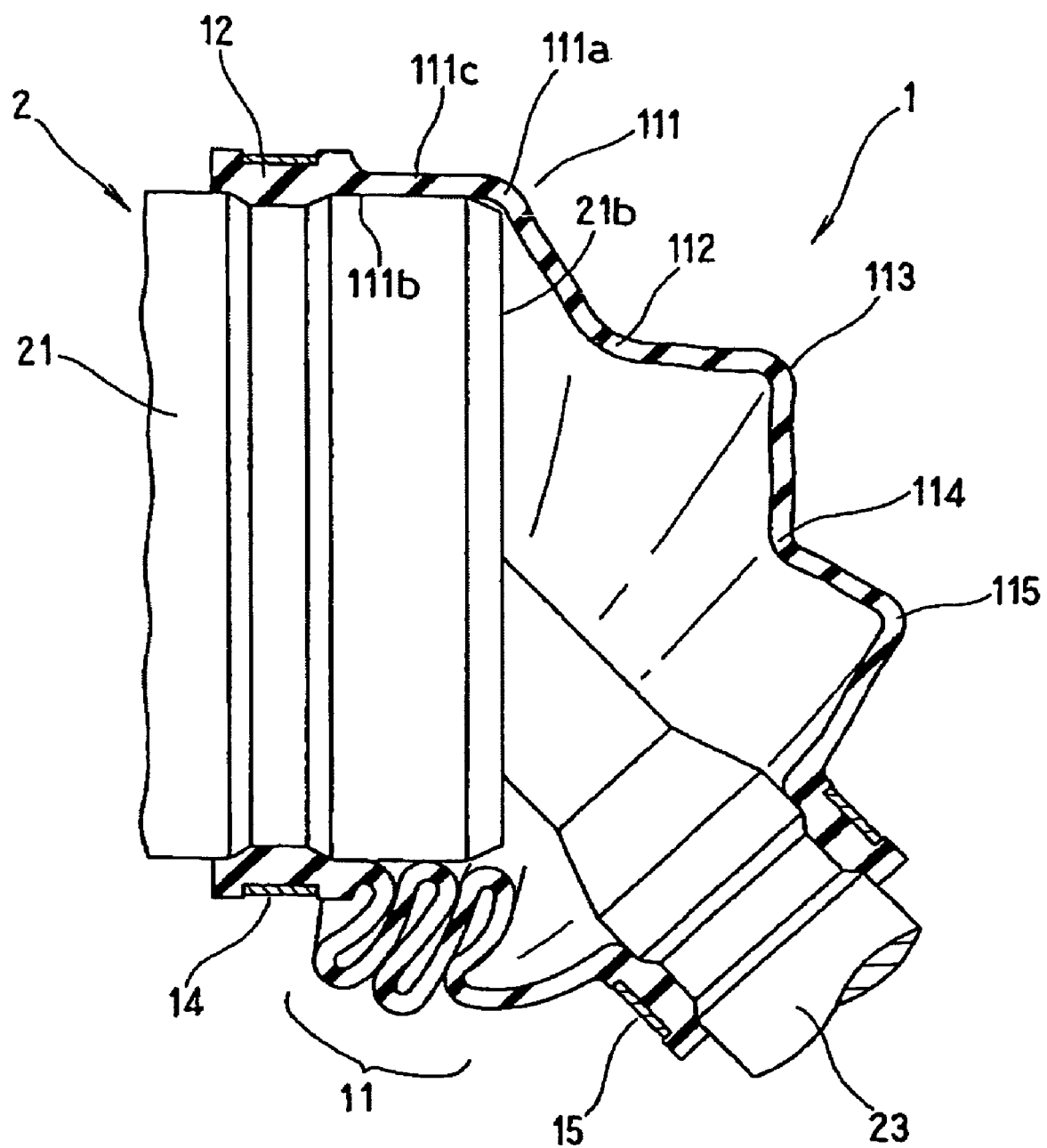
FIG. 3 is a cross sectional view showing a deformed state of the boot as shown in FIG. 1.

FIG. 3 is a cross sectional view showing a deformed state of the boot as shown in FIG. 1, and a part of the constant velocity joint. Since the boot 1 is rotated together with the outer ring 21 (rotation shaft 22) and rotation shaft 23, when the rotation shaft 23 is in a state of being angularly, displaced with respect to the shaft axis of the outer ring 21, the bellows member 11 is deformed in such a repetitious fashion as to be extended in a half rotational cycle, while contracted in another half rotational cycle. Due to a reduction of radius of the top and bottom of the first mountain portion, contraction or folding up of the bellows portion as shown in FIG. 3 occurs on the large diameter mounting portion.

Then, in this configuration of the boot 1, when the rotation shaft 23 is angularly displaced largely as shown in FIG. 3, the bellows member 11 is partly extended and partly contracted due to the angular displacement. At the expanded side of bellows member 11, even if a portion 111c of the first mountain portion 111 between the top 111a and the bottom 111b falls inward, the portion 111c is held by the outer peripheral surface of the outer ring 21 located at the inside of bellows member 11, thereby the first mountain portion 111 is prevented from being reversed inward. This is because the length $L_1$ of the portion 111c between the top 111a and the bottom 111b of the first mountain portion 111 is not more than the length $L_2$ in the axial direction between the bottom 111b and the end portion 21b of the outer ring 21. Therefore, the first mountain portion 111 is not reversed to produce a depression, and lowering of durability due to fatigue of the first mountain portion 111 is effectively prevented.

Further, in case the first valley portion 112 is held on the outer peripheral surface of the outer ring 21 at the side where the bellows member 11 is extended, while the rotation shaft 23 is in a state of being angularly displaced at a large angle as described above, it could lead to reversing of the second mountain portion 113. However, according to the present invention, since the first valley portion 112 is located away from the end portion 21b of the outer ring 21 toward the rotation shaft 23, reversing force of the second mountain portion 113 is effectively absorbed by an inward displacement of the first valley portion 112.

Figure 4:
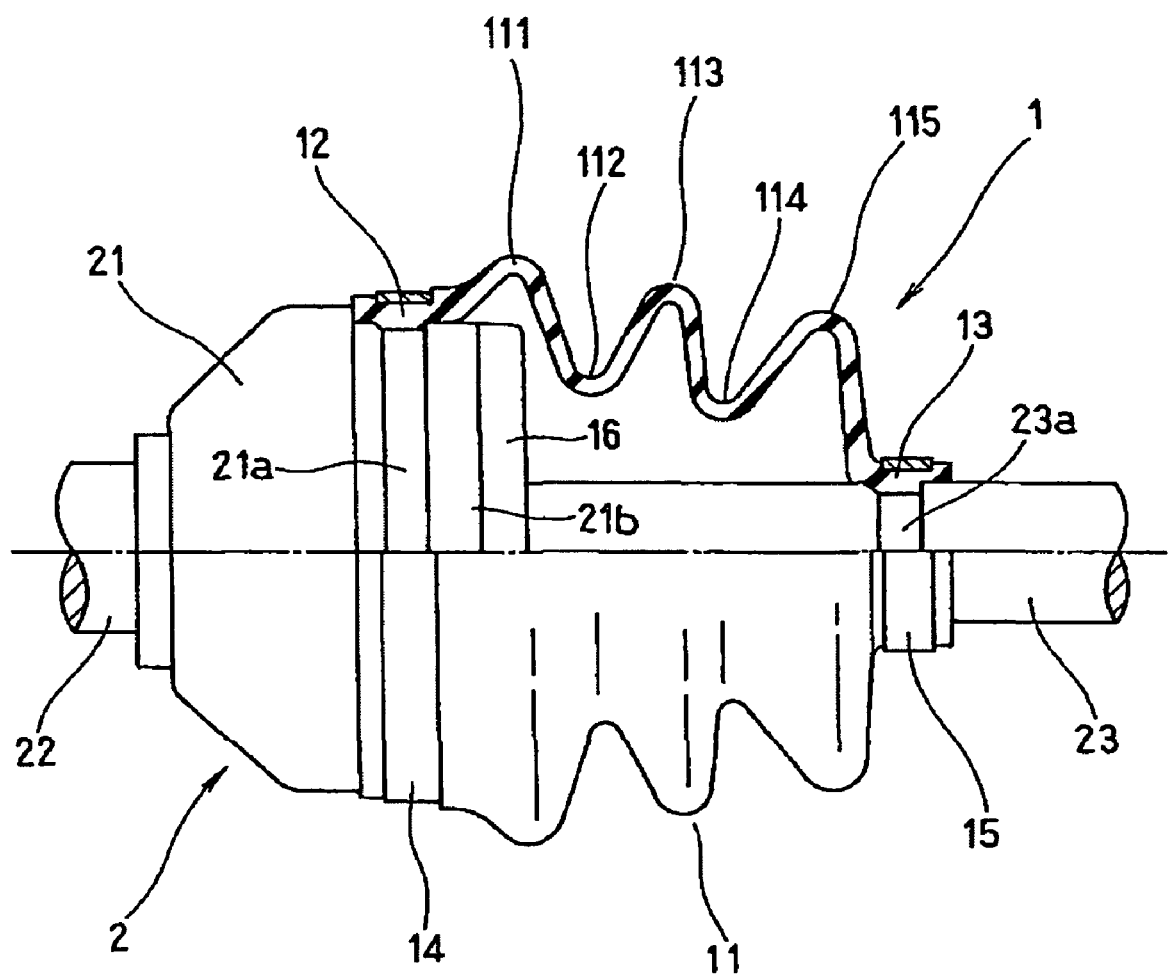
FIG. 4 is a partially cut side view of the boot for sealing a universal joint showing another embodiment of the present invention.
Figure 5:
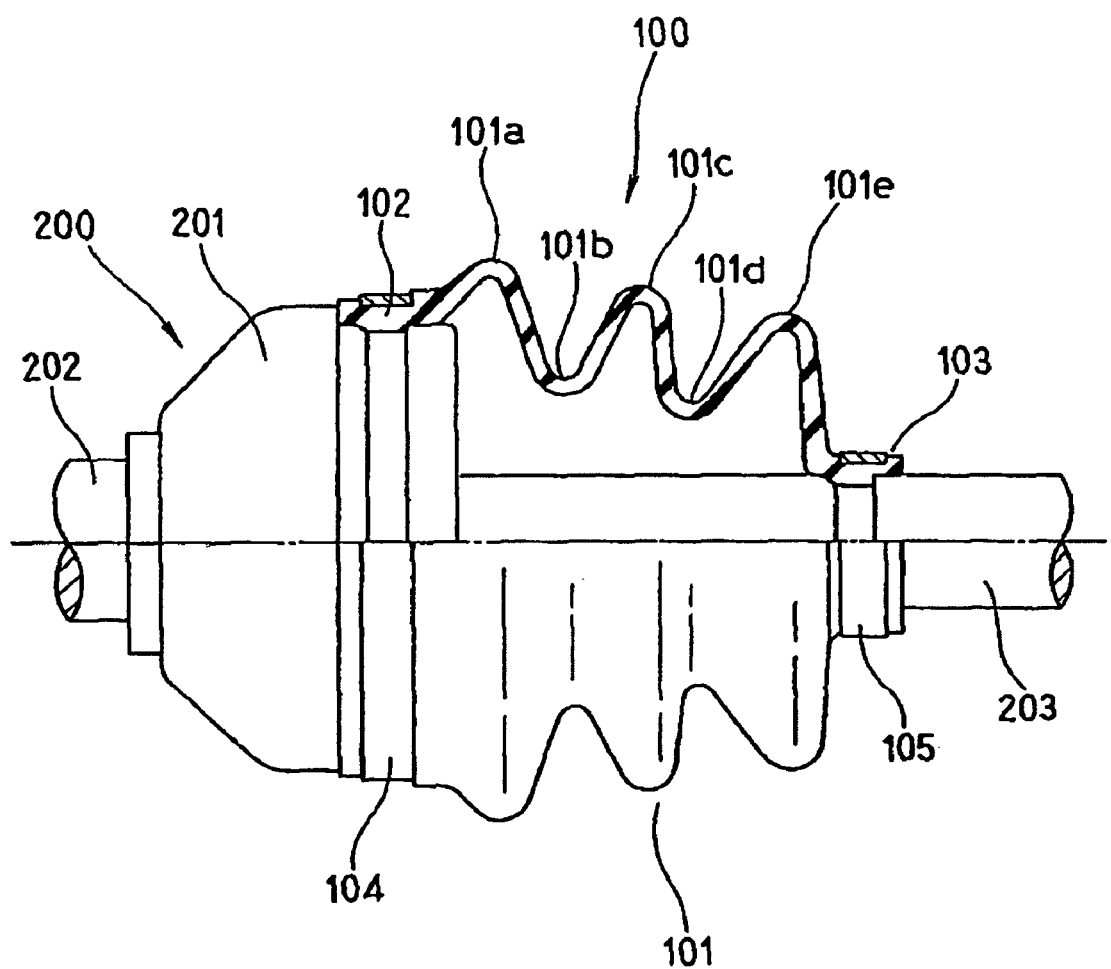
FIG. 5 is a partially cut side view of a conventional boot for sealing a universal joint.
Figure 6:
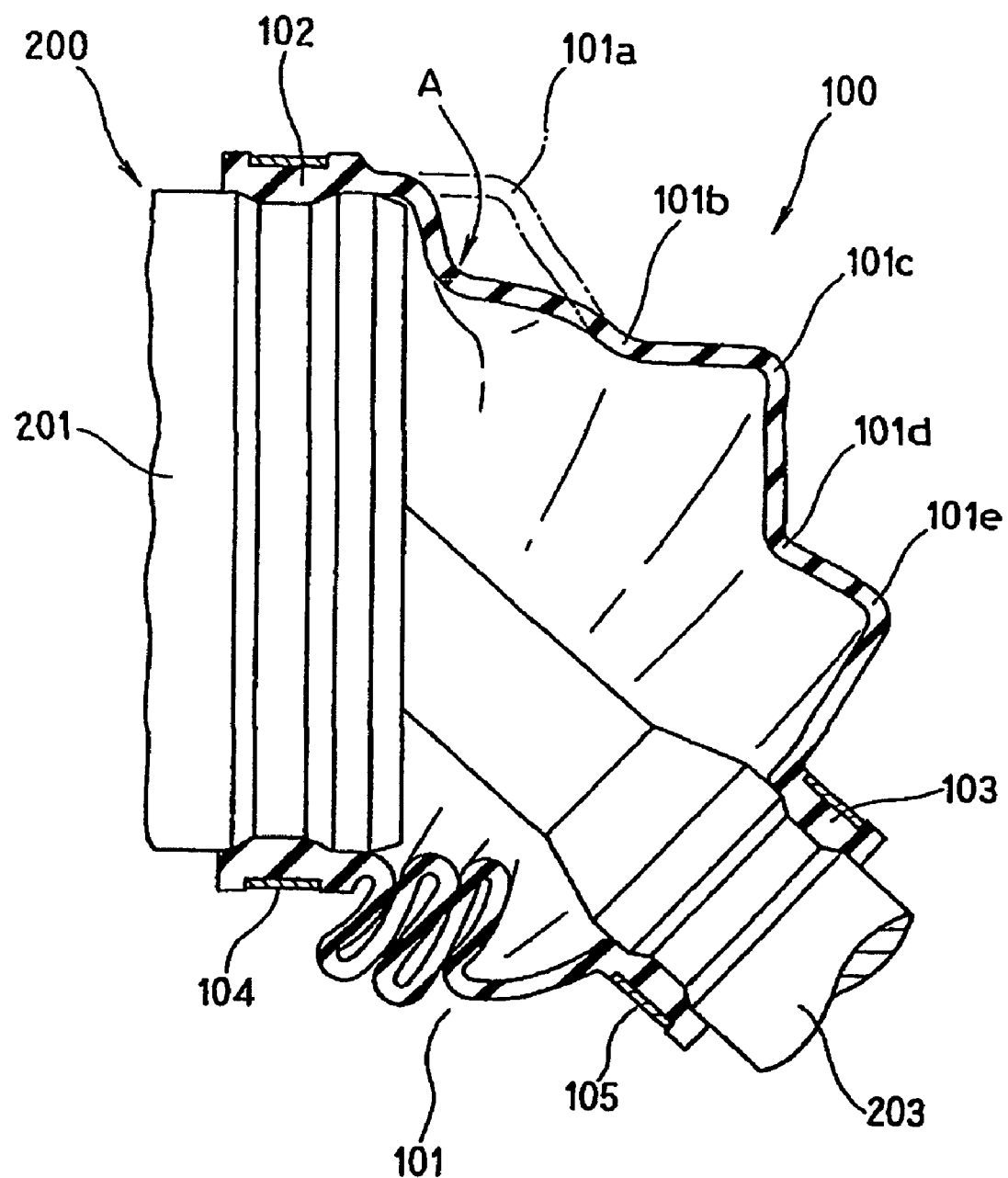
FIG. 6 is a cross sectional view showing a deformed state of the boot as shown in FIG. 5.

FIG. 4 is a partially cut side view showing a boot 1 for a universal joint according to another embodiment of the present invention. In this configuration, a guide ring 16 is attached to the end portion 21b of the outer ring 21 of the constant velocity joint 2 to establish the relationship $L_1 \leq L_2$ as shown in FIG. 2. With such structure, the above-mentioned effect is achieved without changing the design of outer ring 21.

In this embodiment, the guide ring 16 is made of rubber-like elastic material or synthetic resin, and can be attached to the end portion 21b of the outer ring 21 by press fitting, adhesive agent or the like.

INDUSTRIAL APPLICABILITY

The boot according to the present invention is useful means for hermetically sealing a universal joint such as, for example, a constant velocity joint (CVJ) used in a driving shaft or the like of a motor vehicle, since the first mountain portion next to large-diameter mounting member of the bellows member can be prevented from being reversed, even when the rotation shaft coupled to the bearing mechanism is angularly displaced largely with respect to the outer ring of the universal joint.

What is claimed is:

1. A boot and a universal joint in combination, said combination comprising:
    a bellows member including mountain portions and valley portions which extend circumferentially and disposed alternately,
    a large-diameter mounting member formed at one end of the bellows member and mounted on an outer periphery of an outer ring of the universal joint,
    a small-diameter mounting member formed at the other end of the bellows member and mounted on an outer periphery of a rotation shaft coupled so as to be angularly displaceable to a bearing mechanism provided inside the outer ring,
    a first mountain portion of the bellows member next to the large-diameter mounting member rises from the large-diameter mounting member, and
    a length $L_1$ from a top of the first mountain portion to a bottom of the first mountain portion at a side of the large-diameter mounting member being not more than a length $L_2$ from a position on an outer periphery of the outer ring corresponding to a position of an inner periphery of the bottom of the first mountain portion to an end portion of the outer ring at a side of the rotation shaft,
    a portion of the bellows member extending between the top of the first mountain portion and the bottom of the first mountain portion being substantially straight shaped in section, and
    a first valley portion of the bellows member next to the first mountain portion being located away from the end portion of the outer ring toward the rotation shaft to thereby reduce a radius of curvature of the top and bottom of the first mountain portion to permit the bellows member to be contacted or folded up on the large-diameter mountain member.

* * * * *